(12) United States Patent
Barak et al.

(10) Patent No.: US 9,436,832 B2
(45) Date of Patent: *Sep. 6, 2016

(54) SYSTEM AND METHOD FOR VIRTUAL IMAGE SECURITY IN A CLOUD ENVIRONMENT

(71) Applicant: CA, INC., New York, NY (US)

(72) Inventors: Nir Barak, Karmi Yosef (IL); Eitan Hadar, Nesher (IL)

(73) Assignee: CA, INC., New York, NY (US)

(*) Notice: Subject to any disclaimer, the term of this patent is extended or adjusted under 35 U.S.C. 154(b) by 143 days.

This patent is subject to a terminal disclaimer.

(21) Appl. No.: 14/337,771

(22) Filed: Jul. 22, 2014

(65) Prior Publication Data

US 2014/0373180 A1 Dec. 18, 2014

Related U.S. Application Data

(63) Continuation of application No. 13/405,973, filed on Feb. 27, 2012, now Pat. No. 8,839,447.

(51) Int. Cl.

| | |
|---|---|
| *G06F 17/13* | (2006.01) |
| *G06F 21/60* | (2013.01) |
| *H04L 29/06* | (2006.01) |
| *H04W 4/00* | (2009.01) |
| *G06F 9/455* | (2006.01) |
| *G06F 9/46* | (2006.01) |

(52) U.S. Cl.
CPC ........... *G06F 21/60* (2013.01); *G06F 9/45558* (2013.01); *G06F 9/468* (2013.01); *H04L 63/10* (2013.01); *H04W 4/003* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 4,969,092 A | 11/1990 | Shorter | |
| 4,991,089 A | 2/1991 | Shorter | |
| 5,095,427 A | 3/1992 | Tanaka | |
| 6,496,847 B1* | 12/2002 | Bugnion | ............. G06F 9/45533 703/21 |
| 7,802,251 B2 | 9/2010 | Kitamura | |
| 7,961,722 B1 | 6/2011 | Jankowski | |
| 7,962,950 B2 | 6/2011 | Choo | |
| 8,104,083 B1* | 1/2012 | Sobel | .................. G06F 9/45558 726/17 |
| 8,201,237 B1 | 6/2012 | Doane | |

(Continued)

OTHER PUBLICATIONS

Office Action issued for U.S. Appl. No. 14/213,881 dated Jul. 16, 2014.

(Continued)

*Primary Examiner* — Peter Poltorak
(74) *Attorney, Agent, or Firm* — Pillsbury Winthrop Shaw Pittman LLP (57) ABSTRACT

Systems and methods enabling secure virtual image access in a virtual or cloud computing environment. The systems and methods include assigning a status to indicator to guest virtual machines (virtual images) that provide applications and other services to cloud consumers in the cloud environment. A virtual appliance machine in the cloud environment maintains the status of the guest virtual machines and makes decisions based on the status as to whether to allow access to the guest virtual machines. These decisions are transmitted to local elements on the guest virtual machines, which enforce access control on a local level. In this manner, unauthorized virtual image access is prevented providing increased security and data integrity.

20 Claims, 4 Drawing Sheets

(56) References Cited

U.S. PATENT DOCUMENTS

| | | |
|---|---|---|
| 8,443,440 B2 | 5/2013 | McGee |
| 8,484,732 B1 | 7/2013 | Chen |
| 8,528,070 B2 | 9/2013 | Stiekes |
| 8,533,343 B1* | 9/2013 | Beda, III ............... G06F 9/546 709/227 |
| 8,538,919 B1 | 9/2013 | Nielsen |
| 8,700,898 B1 | 4/2014 | Korthny |
| 9,213,513 B2* | 12/2015 | Hartz .................... G06F 3/1288 |
| 2002/0069335 A1* | 6/2002 | Flylnn, Jr. ............ G06F 3/0619 711/153 |
| 2003/0065676 A1* | 4/2003 | Gbadegesin ........ H04L 63/0254 |
| 2004/0215848 A1* | 10/2004 | Craddock ............... H04L 49/90 710/39 |
| 2004/0230972 A1* | 11/2004 | Donovan ............ G06F 9/45533 718/1 |
| 2005/0097534 A1 | 5/2005 | Clement |
| 2005/0108709 A1* | 5/2005 | Sciandra ................ G06F 9/505 718/1 |
| 2005/0183143 A1 | 8/2005 | Anderholm |
| 2006/0005184 A1* | 1/2006 | Tewari ................ G06F 9/45533 718/1 |
| 2006/0064697 A1* | 3/2006 | Kagi ..................... G06F 9/5011 718/103 |
| 2006/0143359 A1* | 6/2006 | Dostert ................... G06F 9/544 711/6 |
| 2007/0043860 A1* | 2/2007 | Pabari .................. G06F 9/5072 709/224 |
| 2007/0106992 A1* | 5/2007 | Kitamura ............. G06F 3/0607 718/104 |
| 2007/0204153 A1 | 8/2007 | Tome |
| 2007/0300220 A1* | 12/2007 | Seliger ..................... G06F 8/61 718/1 |
| 2008/0028145 A1* | 1/2008 | Lecomte ............... G06F 3/0614 711/114 |
| 2008/0086726 A1* | 4/2008 | Griffith ................... G06F 9/544 718/1 |
| 2008/0163211 A1 | 7/2008 | Mizuno |
| 2008/0184226 A1* | 7/2008 | Ota ......................... H04L 67/22 718/1 |
| 2008/0256533 A1* | 10/2008 | Ben-Yehuda ....... G06F 9/45558 718/1 |
| 2008/0271015 A1 | 10/2008 | Ibrahim |
| 2009/0013149 A1* | 1/2009 | Uhlig ................... G06F 12/109 711/207 |
| 2009/0198809 A1 | 8/2009 | Goto |
| 2009/0216975 A1* | 8/2009 | Halperin ............. G06F 9/45537 711/162 |
| 2009/0293056 A1 | 11/2009 | Ferris |
| 2009/0300607 A1 | 12/2009 | Ferris |
| 2009/0307705 A1 | 12/2009 | Bogner |
| 2009/0328225 A1* | 12/2009 | Chambers ............... G06F 21/10 726/26 |
| 2010/0031339 A1 | 2/2010 | Minnen |
| 2010/0042720 A1 | 2/2010 | Stienhans |
| 2010/0125664 A1 | 5/2010 | Hadar |
| 2010/0125902 A1 | 5/2010 | Killian |
| 2010/0132016 A1 | 5/2010 | Ferris |
| 2010/0198972 A1 | 8/2010 | Umbehocker |
| 2010/0199037 A1 | 8/2010 | Umbehocker |
| 2010/0205304 A1 | 8/2010 | Chaturvedi |
| 2010/0287280 A1 | 11/2010 | Sivan |
| 2010/0299366 A1 | 11/2010 | Stienhans |
| 2010/0306463 A1 | 12/2010 | Nakamura |
| 2010/0325628 A1* | 12/2010 | Haga .................... G06F 21/575 718/1 |
| 2011/0022574 A1 | 1/2011 | Hansen |
| 2011/0047543 A1 | 2/2011 | Mohinder |
| 2011/0055378 A1 | 3/2011 | Ferris |
| 2011/0055714 A1 | 3/2011 | Vemulapalli |
| 2011/0072487 A1 | 3/2011 | Hadar |
| 2011/0099548 A1* | 4/2011 | Shen ................... G06F 9/45558 718/1 |
| 2011/0138047 A1 | 6/2011 | Brown |
| 2011/0142053 A1 | 6/2011 | Van Der Merwe |
| 2011/0179162 A1* | 7/2011 | Mayo ..................... G06F 9/5077 709/224 |
| 2011/0179417 A1* | 7/2011 | Inakoshi ............. G06F 9/45558 718/1 |
| 2011/0197065 A1 | 8/2011 | Stauth |
| 2011/0205585 A1* | 8/2011 | Mihara ................. G06F 3/1203 358/1.15 |
| 2011/0225582 A1 | 9/2011 | Iikura |
| 2011/0314157 A1* | 12/2011 | Saito ..................... G06F 9/5077 709/226 |
| 2012/0054486 A1 | 3/2012 | Lakkavalli |
| 2012/0072685 A1* | 3/2012 | Otani ................... G06F 11/1451 711/162 |
| 2012/0096460 A1* | 4/2012 | Sekiguchi ........... G06F 9/45558 718/1 |
| 2012/0120441 A1 | 5/2012 | Kaneko ................. H04L 41/069 358/1.15 |
| 2012/0144005 A1 | 6/2012 | Quintard |
| 2012/0151482 A1* | 6/2012 | Lee ..................... G06F 9/45558 718/1 |
| 2012/0159469 A1 | 6/2012 | Laor |
| 2012/0179904 A1 | 7/2012 | Dunn |
| 2013/0007469 A1* | 1/2013 | Aratsu ..................... G06F 21/53 713/190 |
| 2013/0042115 A1* | 2/2013 | Sweet ................. H04L 63/0428 713/176 |
| 2013/0097296 A1 | 4/2013 | Gehrmann |
| 2013/0097377 A1* | 4/2013 | Satoyama ............. G06F 3/0605 711/114 |
| 2013/0185720 A1* | 7/2013 | Tuch ..................... G06F 12/023 718/1 |
| 2013/0212709 A1* | 8/2013 | Tucker ..................... G06F 21/55 726/29 |
| 2013/0227550 A1 | 8/2013 | Weinstein |
| 2013/0227567 A1* | 8/2013 | Horikawa ........... G06F 9/45533 718/1 |
| 2013/0227699 A1 | 8/2013 | Barak |
| 2013/0227710 A1 | 8/2013 | Barak |
| 2013/0263208 A1 | 10/2013 | Challa |
| 2014/0006776 A1 | 1/2014 | Scott-Nash |
| 2014/0096134 A1 | 4/2014 | Barak |
| 2014/0208319 A1* | 7/2014 | Yoshimura ............. G06F 21/53 718/1 |

OTHER PUBLICATIONS

Notice of Allowance as issued for U.S. Appl. No. 13/633,454, dated Nov. 29, 2013.

Final Office Action as issued for U.S. Appl. No. 13/406,088, dated Feb. 12, 2014.

Non-Final Office Action issued for U.S. Appl. No. 13/406,088, dated Oct. 7, 2013.

* cited by examiner

SYSTEM AND METHOD FOR VIRTUAL IMAGE SECURITY IN A CLOUD ENVIRONMENT

CROSS-REFERENCE TO RELATED APPLICATIONS

This application is a continuation of U.S. patent application Ser. No. 13/405,973, filed Feb. 27, 2012, which is incorporated herein in its entirety by reference.

This application is related to the following co-pending applications filed Feb. 27, 2012, the disclosures of each of which are hereby incorporated by reference herein in their entirety: U.S. patent application Ser. No. 13/406,036, entitled "System and Method for Securing Leased Images in a Cloud Environment;" and U.S. patent application Ser. No. 13/406,088, entitled "System and Method for Isolated Virtual Image and Appliance Communication within a Cloud Environment."

FIELD

The invention relates generally to access control of images in a cloud computing environment, and more particularly to access control of images in a cloud computing environment using a distributed image reservation system.

BACKGROUND

Cloud computing environments have turned around the manner in which business organizations examine the requirements and capacity to implement their data processing needs. A cloud computing environment may include capabilities where a cloud provider hosts hardware and related items and provides systems and computational power as a service to a customer or other user (e.g., individual consumers, business organizations, or other entities). When implementing data processing needs via a cloud vendor, a user does not need to bear the cost of space, energy, and maintenance in order to acquire the required computational resources at a reasonable cost.

In some instances, the cloud provider provides images and/or image bundles to the customer. In some instances, the cloud provider hosts images provided by the customer. As used herein, an "image" may refer to a virtual machine in a cloud environment. Certain virtual machines/images in a cloud environment may provide a specific service or set of specific services for use by a customer. These may be referred to herein as a "guest virtual machines." The services provided by the guest virtual machines may be, for example, applications, data, or other services. For example, a customer may require use of an application that can be provided by a cloud vendor. However, the customer may not require a complete version of the application with all features, and may only need to use some features of the application. In such a scenario, the cloud vendor may customize the application for the customer and form a guest virtual machine supporting the application for use by the customer. Similarly, a snapshot of a database that has data for testing may be supported by a guest virtual machine and provided to a customer for use. Generally, any resource or application can be provided to or supported for a customer for a limited period of time in the cloud environment via a guest virtual machine. Once provided to the customer for a period of time, a guest virtual machine is deemed as leased for that period of time.

When a user is finished using a guest virtual machine, they may simply abandon use or may provide an indication that use has been temporarily or permanently terminated. Furthermore, other indicators that use is temporarily or permanently terminated may also occur (e.g., the expiration of a service contract). In some instances, a cloud environment provider may delete the environment or cleanup the content of guest virtual machines upon such termination. However, formal de-provisioning and clearance processes are not widely relied upon. While some clearing processes exist, they rely on the cloud provider to operate properly. Accordingly, the cloud consumer has no control over the process. Often, versions of a guest virtual machine may remain on the cloud provider environment after cleanup and may expose the machines to misuse. Furthermore, current systems do not include de-provisioning compliance reports or assurances that backup machines or other duplicate were destroyed. Consequently, there is a potential risk for data leftover on machines that are not deleted or re-instantiated to the basic state. Because data can be exposed in unused, dormant machines, there is a need to lock and prevent the use of guest virtual machines.

Protection is relevant not only from unauthorized users outside of an organization, but for internal cloud implementations internal security is also a relevant consideration such that segregation of information between departments within the same organization (e.g., finance, HR, sales, R&D, etc.) is desirable.

Accordingly, a solution is needed for verification of returned/checked-in/end-of-service images so that such guest virtual machines cannot be used again so that data left on such machines will not be exposed. Further, such attempted unauthorized activity should be exposed to validate regulation and compliance needs.

SUMMARY

The invention addressing these and other problems relates to systems and methods enabling secure virtual image access in a virtual or cloud computing environment. The systems and methods include assigning a status indicator to guest virtual machines (virtual images) that provide applications and other services to cloud consumers in the cloud environment. A virtual appliance machine in the cloud environment maintains the status of the guest virtual machines and makes decisions based on the status as to whether to allow access to the guest virtual machines. These decisions are transmitted to local elements on the guest virtual machines, which enforce access control on a local level. In this manner, unauthorized virtual image access is prevented providing increased security and data integrity.

A system for providing secure virtual image access may reside in a virtual or cloud computing environment. The system may include a virtual appliance machine (also referred to herein as a "virtual access control machine") and/or the components thereof and that interact with one or more guest virtual machines (also referred to as "images" or a "virtual images") and/or various components thereof. As the guest virtual machines described herein are virtual in nature, the ability to control and/or limit their use is different from that of physical machines. Accordingly, the virtual appliance machine provides access control features for the one or more guest virtual machines.

A guest virtual machine provides one or more applications, media, data access, data manipulation, and/or other "services" to consumers in the cloud environment. The services provided by an individual guest virtual machine may be customized according to the needs of a given user such that a bundle or suite of services may be provided to a user by a given guest virtual machine or several guest virtual machines. Furthermore, a guest virtual machine may provide applications, media, data, or other services that a user has loaded onto the guest virtual machine themselves. Accordingly, a guest virtual machine may provide storage and/or processing services to a user. A user may interact with a guest virtual machine on the cloud computing environment where it resides using one or more user devices. For example, a user device may connect to the cloud environment via a network (e.g., the Internet, a private network, and/or other network).

As described herein, access and misuse protections may be provided by proper disposal of virtual guest machines. As a guest virtual machine may include a specific instantiated representation of one or more applications or other services, once it is no longer needed or available to a user the specific guest virtual machine may be segregated from access by user machines and therefore from access by users. Accordingly, the systems and methods provided herein associate guest virtual machines with specific status indicators that may be used to provide access control.

Methods for providing secure image access may include assigning a image status (e.g., "active" or "inactive") that indicate whether the image is able to be used or is not to be used. The image status may be assigned and stored by a virtual appliance machine which thereby enables administration of image access control for a portion of or the entirety of a cloud environment.

In some instances, a guest virtual machine may need to be installed and subsequently initialized to be ready for use by users. For example, a guest virtual machine may be created and installed on a cloud environment by a cloud environment provider and may initially have a status of "null." When the guest virtual machine is ready for use by a user, an indication may be sent changing the status of the guest virtual machine to "active" (initialized).

In some instances, a guest virtual machine may no longer be appropriate for use. Any number of circumstances may exist that create or instantiate a deactivation trigger for the guest virtual machine. Accordingly, when one or more deactivation triggers occurs, the virtual appliance machine may mark the image status of the guest virtual machine as "inactive."

When an attempted use of the guest virtual machine is detected or received at the guest virtual machine, the virtual appliance machine that controls access to the guest virtual machine is contacted and informed of the access attempt. The virtual appliance machine then identifies its stored image status of the guest virtual machine on which an access attempt has been made. The virtual appliance machine then determines whether the attempted use of the guest virtual machine is permitted (e.g., whether the image status is "active" or "inactive"). If the image status is "active," the virtual appliance machine determines that access may be granted and communicates with the guest virtual machine to provide access. If the image status is "inactive," the virtual appliance machine communicates with the guest virtual machine to deny access. Furthermore, if access is denied, an alert my be generated, stored, and sent to one or more entities.

Stored image status indicators for guest virtual machines and stored alerts (including access attempts) may be used to generate reports to cloud providers, users, and/or other entities.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Prevention of unauthorized repeatable usage of virtual images is important to maintain security and business integrity for cloud environment providers and their customers. Images that are no longer in use (e.g., checked back into to a cloud image pool or requested to be de-commissioned and presumably un-provisioned) must be protected from unauthorized use. Typical systems may leave images in cloud computing environments vulnerable. Accordingly, provided herein are systems and methods for cataloguing and maintaining the status of virtual images so as to provide protection of data and prevention against unauthorized use. As used herein, "unauthorized use" may include both intentional unauthorized use (e.g., piracy or malicious use) and un-intentional unauthorized use (e.g., a previously authorized user is attempting to use an expired image).

The virtual image access control provided herein increases transparency and trust in cloud environments through increased control over the fulfillment of de-provisioning of virtual images and containment for cloud providers having multiple consumers (e.g., so that one consumer is not able to access images used by another consumer).

In some implementations, the systems and methods described herein also provide active monitoring so as to prevent unauthorized use of virtual images and activation interception (which prevents unauthorized initialization). In some implementations, process and labor efficiency for access control are also provided, as the systems and methods herein may include no need to rely on reactive procedures for virtual image disposal (as image disposal is based on rapid real time interceptions, rather than validating for every case). For example, in some instances, a cloud environment enables consumers to "return" a virtual image after he or she is finished using it (or otherwise indicate that use is no longer needed). In current systems, the returned image needs to be manually deleted. If this is not done, or if backup or other copies are not deleted, the image remains vulnerable to misuse. The systems and methods provided herein may provide protection against such misuse. This may be done by ensuring that any undeleted images that should not be available for use are not able to be initialized.

Furthermore, in some implementations, the systems and methods herein provide compliance and governance transparency, because virtual image activation is reported and known, therefore increasing trust and transparency, as well as enabling reporting of use patterns according to any number of regulations. These benefits utilize the misuse alerting features as the alerts enabled herein can notify a cloud environment provider and/or an authorized user regarding potential theft/misuse of an image, therefore detecting areas in the cloud computing infrastructure that are susceptible for attack.

Enhanced de-provisioning transaction integrity is also provided by the systems and methods herein as de-provisioning is validated and stable on an image-specific basis. Additionally, the systems and methods provided herein enable self-service quality selection in that they enable selection of the type of protection needed from a vendor on subscription to the cloud environment. For example, a consumer may ask for specific security policies on a per machine basis (e.g., no protection at all, simple warnings that allow access but alert certain personnel of use or attempted use, or prevention of all unauthorized access) so as to enable customized protection plans for consumers.

Insider threat detection is also enabled because the systems and methods herein support the detection of potential insider threat on image probing without consent from the cloud environment provider, as well as the prevention of the potential damage. The systems and methods described herein may support the segregation of departments by enforcement of strong separations of access permits within an organization. Therefore, consumer entities having sensitive departments (such as, for example, M&A machines, R&D machines, and Sales and Finance machines, etc.) can guard against misuse by blocking unauthorized use. For example, if an image used by a finance department is returned back to an internal cloud, the R&D department cannot access the image by accident.

Given the advantages discussed herein, the systems and methods described herein may be useful for access control of onetime use disposable virtual images as well as longer term or repeated use of images in a cloud environment. Potential misuse of virtual images and their information may be guarded against in a shared an image supplier environment (e.g., a shared image pool of a cloud provider), thus enforcing image usage segregations.

Figure 1:
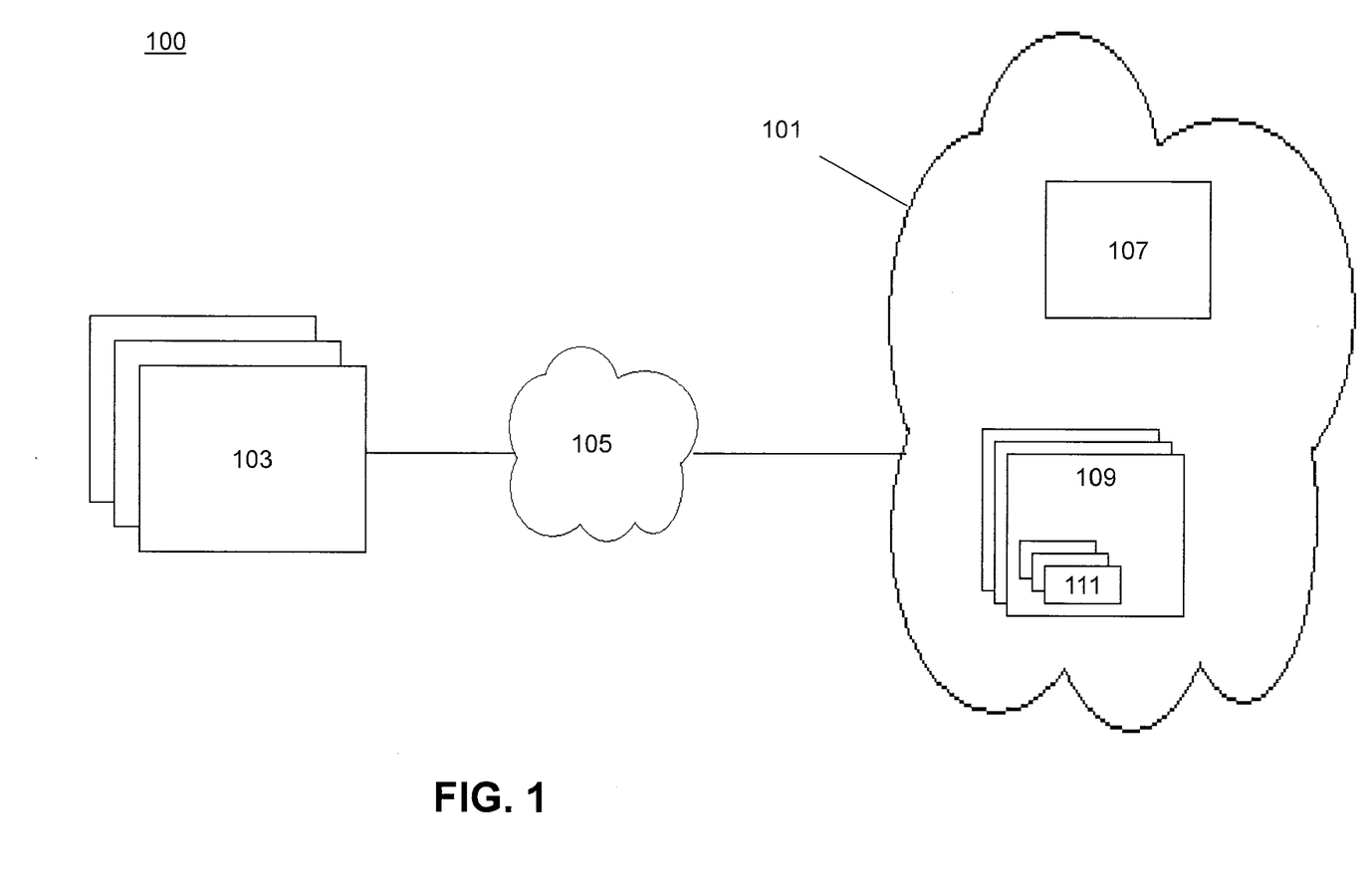
FIG. 1 is an illustration of an example system for providing access control of images in a cloud computing environment, according to various implementations of the invention.

FIG. 1 illustrates an environment 100, which is an example of an environment wherein a system resides for secure virtual image access in a virtual computing environment. Environment 100 may include a cloud environment 101, one or more user devices 103, a computer network 105, and/or other elements.

In some implementations, cloud environment 101 may be or include a virtualized computing environment wherein one or more services are provided to one or more users at one or more user devices 103 over a network. In some implementations, cloud environment 101 may provide images out of a shared pool. The images may be used by consumers as virtual machines and "returned" to the pool when no longer needed. In some implementations, cloud environment 101 may include a virtual appliance machine 107 and one or more guest virtual machines 109. As an "image" or "virtual image" refers to a virtual machine in a cloud or other virtualized computing environment that provides a specific service or set of specific services for use by a customer, the term "guest virtual machine" is used herein to refer to an "image" or a "virtual image." Other virtual machines in a cloud environment may also be considered "images."

Virtual appliance machine 107 may be or include a virtual machine that serves as an access controller for one or more guest virtual machines 109 in cloud environment 101. Accordingly, virtual appliance machine 107 may also be referred to as a "virtual access control machine" 107.

In some implementations, one or more applications, media, data access, data manipulation, and/or other services 111 are provided to consumers (operating one or more user devices 103) via virtual guest machines 109. Services 111 provided by an individual guest virtual machine 109 may be customized according to the needs of a given user such that a bundle or suite of applications or other services 111 may be provided to a user by a given guest virtual machine 109 and or such that a given customized instance of an application 111 may be provided to a user by a given guest virtual machine 109 or by several guest virtual machines. Furthermore, guest virtual machine 109 may provide applications, media, data, or other services 111 that a user has loaded onto guest virtual machine 109 themselves. Accordingly, guest virtual machine 109 may provide storage and/or processing services to a user.

As used herein, the term "virtual machine" (e.g., guest virtual machine 109, virtual appliance machine 107) refers to a logically defined computing machine (as opposed to a physically defined computing machine) that may be identified by one or more logical characteristics but which in reality is composed of or supported by a static or dynamic set of one or more physical computing devices providing memory, processing power, or other computing features. A virtual machine is essentially an emulation of computing hardware (physical computing devices), wherein software is used to provide a computing environment that looks to users as physical machine that the user can run applications on. Accordingly, the actions performed by virtual machines described herein, including virtual appliance machine 107 and guest virtual machine 109, may be performed using one or more processing devices (e.g., microprocessors) of one or more physical computing machines supporting the virtual computing environment. Similarly, any data storage needs or actions relating thereto may be provided or facilitated by the memory devices (e.g., RAM, hard disc, eeprom, flash memory, etc.) of one or more physical computing machines supporting the virtual computing environment. Furthermore, the term "cloud computing" or "cloud computing environment," may refer to a virtual computing environment supporting one or more virtual machines.

As described herein, applications/services 111 are provided to users via guest virtual machines 109. As guest virtual machines 109 are virtual in nature, the ability to control and/or limit their use is different from that of physical machines. Accordingly, as described herein, virtual appliance machine 107 provide for control of guest virtual machines within cloud environment 101.

In some implementations, guest virtual machine 109 may be provided for the specific use of a user, or group of users. Through guest virtual machine 109, a user may utilize or interact with the one or more services 111 hosted thereon. As discussed above, in some implementations, guest virtual machine 109 may be provided with one or more applications or services 111 installed thereon. In some implementations, a user may install one or more applications/services 111 onto a guest virtual machine 109 provided by a provider of cloud environment 101.

In some implementations, a user may interact with guest virtual machine 109 via one or more of user devices 103. For example, a user device 103 may connect to cloud environment 101 via network 105 and therefore be provided with access to a specific guest virtual machine 109 that provides one or more services 111. In some implementations, user devices 103 may be or include one or more servers, desktop computers, laptop computers, tablet computers, hand-held computers, smart phones, cellular phones, personal digital assistants (PDAs), and/or other computing devices.

Network 105 may be or include the Internet or the World Wide Web ("www"). In some implementations, network 105 may be or include a switching fabric that is part of a Wide Area Network (WAN), a Local Area Network (LAN), or other types of networks known to those of ordinary skill in the art (e.g., a TCP/IP network). In some implementations, network 105 routes requests and/or other communication between cloud environment 101 and user devices 103. In some implementations, network 105 may use or include wired, wireless, optical, or other types of communication links.

As described herein access and misuse protections may be provided by proper segregation and/or disposal of guest virtual machines. As a guest virtual machine (e.g., guest virtual machine 109) may include a specific instantiated representation of one or more services 111, once it is no longer needed or available to a user (e.g., because a user's agreement for use has expired or been terminated) the specific guest virtual machine may be segregated from access by user devices and therefore from access by users. Furthermore, specific guest virtual machines that are no longer to be used may be destroyed/erased (i.e., removed from the "disk" or memory of cloud environment 101). This functionality is provided by maintenance of specific status indicators for specific guest virtual machines.

Figure 2:
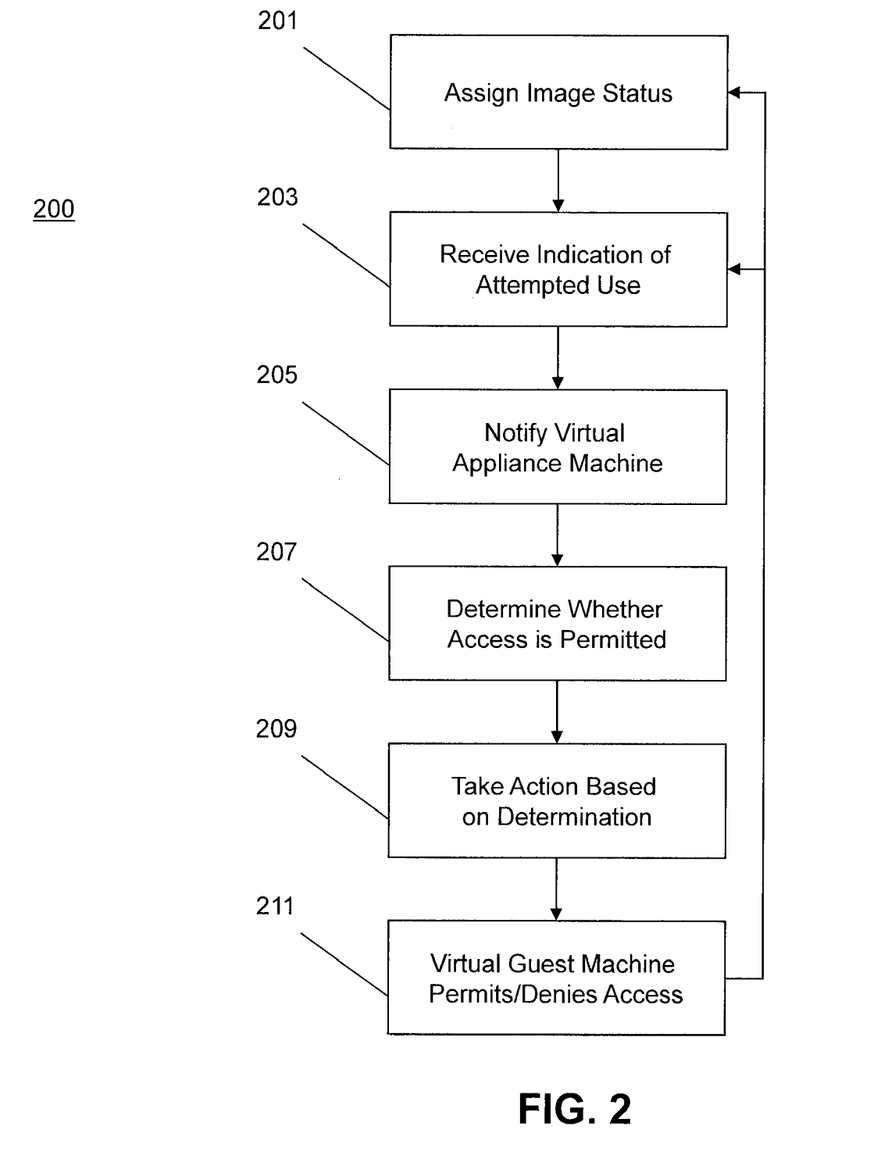
FIG. 2 is an illustration of an example of a method for providing access control of images in a cloud computing environment, according to an implementation of the invention.

In some implementations, the invention provides methods for providing secure virtual image access. FIG. 2 illustrates a process 200, which is an example of a process for providing secure virtual image access. Process 200 may include an operation 201, wherein a guest virtual machine of a cloud computing environment (e.g., an guest virtual machine 109 in environment 101) that provides one or more applications or services (e.g., applications/services 111) to users across a network (e.g., user devices 103 across network 105) is assigned an image status. In some implementations, the image status may be or include indicators such as, for example, "active" or "inactive" that indicate whether the image is able to be used (active) or not to be used (inactive). Other indicators may also be used. For example, "inactive" may indicate that an image has been disposed of and can never be reactivated, while the status of "disabled" may simply indicate that it cannot be used, but that it may be switched to "active" upon occurrence of a certain trigger. Some statuses may indicate that use is to be permitted but that an alert is to be sent to appropriate personnel according to an alert policy. Furthermore, a null status for new machines that have not yet been activated may be used. Any number of statuses providing different information regarding a machine's state may be used.

The image status may be assigned by and stored in virtual appliance machine (e.g., virtual appliance machine 107), which may serve to control status indicators for multiple guest virtual machines (e.g., guest virtual machines 109) and thereby enable administration of image access control for a substantial portion of or an entire cloud environment (e.g., cloud environment 101).

In some instances, a guest virtual machine may need to be created (instantiated), set up, and subsequently initialized to be ready for use by users. For example, in some implementations, a guest virtual machine (guest virtual machine 109 of FIG. 1) may be instantiated from a template or otherwise instantiated on a cloud environment (e.g., cloud environment 101) by a cloud environment provider. The created/instantiated guest virtual machine may then be set up according to its intended use. For example, the guest virtual machine may be customized and/or loaded with software (that provide applications/services, e.g., applications/services 111) and otherwise programmed to be used by its intended user. After, setup, the guest virtual machine may initially have a null status. When the guest virtual machine is ready for use by a user, an indication (or "activation trigger") may be sent changing the status of the guest virtual machine to "active" (initialization). This indication may be sent by the cloud environment provider, may be done by the user, or may be accomplished by a combination of the two (e.g., the user tells the cloud provided that they want to use the guest virtual image, who subsequently sends the indication to initialize it). Once a guest virtual machine is assigned an "active" status, authorized users can then use it.

In some instances, a guest virtual machine may no longer be appropriate for use. For example, a user may have an agreement/contract with a provider of a cloud environment that allows the user to access a guest virtual machine for a certain period of time in exchange for a fee. Expiration of the contract or failure of the user to make a payment may be deactivation triggers (or may lead to a deactivation trigger being generated) indicating that the user (or any other user) should no longer be authorized to access the image. Accordingly, a virtual appliance machine (e.g., virtual appliance machine) may mark the image status of the guest virtual machine as "inactive" or "disabled." In some instances, the provider may provide a user with the ability to use one or more services (e.g., services 111), but a given guest virtual machine to which the user has access may provide an out of date version of the service (e.g., an out of date application). Accordingly, a new guest virtual machine that provides having an updated version of the service/application may be created and provided with an "active" image status.

As is apparent from (but not limited to) these examples, many different circumstances may serve as a deactivation trigger (or may lead to generation of a deactivation trigger) for a guest virtual machine. When a given guest virtual machine is no longer needed or of use, such that it is desirable to effectively decommission, a deactivation trigger occurs or is produced and the image status of the guest virtual machine may be marked as "inactive" or "disabled." Accordingly, as discussed herein user (or any other users) can no longer access the guest virtual machine or any data, applications, or other services provided thereon.

In an operation 203, an attempted use of the guest virtual machine is detected or received. In some implementations, the attempted use is detected or received at the guest virtual machine. An attempted use may include a user of a user device 103 attempting to start the guest virtual machine, establish a connection with or otherwise login to the guest virtual machine, and/or otherwise attempt to use the applications/services provided thereby. In some instances, the user may be, for example, an authorized user who is trying to start the guest virtual machine that a cloud provider is contractually obligated to provide to the user. In some instances, the user may be, for example, a user who at one time was authorized to access the guest virtual machine, but whose contract has lapsed such that the user should no longer be able to start the guest virtual machine. In some instances, the user may be, for example, a user who has never been authorized to access the guest virtual machine (e.g., a user trying to start the guest virtual machine without contracting with the cloud environment provided to do so; e.g., a malicious or mistaken user). Other attempted use scenarios may also exist.

As the user attempts to start or connect with the guest virtual machine, in an operation 205, the guest virtual machine may forward the access attempt (or otherwise communicate that the access attempt has occurred) to a virtual appliance machine that is assigned to control access to the guest virtual machine (e.g., virtual appliance machine 107 that controls access to guest virtual machine 109). In some implementations, a certificate indicating the identify of the particular guest virtual machine on which the access attempt has been made may be forwarded from the guest virtual machine to the virtual appliance machine along with forwarding the access attempt (or the indication thereof). In an operation 207, the virtual appliance machine determines whether the attempted use of the image is permitted. This determination is based, at least in part, on ascertaining the stored image status associated with the guest virtual machine on which the access attempt has been made. For example, if the image status is "inactive" or "disabled," the virtual appliance machine may determine that no users are to be given access to the image. If the image status is "active," the virtual appliance machine may determine that access may be granted. In this instance, whether access is actually granted to the user attempting to use the image in operation 203 may be further based on other authentication or credentialing operations (e.g., login/password operations).

In an operation 209, the virtual appliance machine may take an action based on the decision in operation 207 regarding whether to permit the attempted use of the image. For example, if the image status is "active," the virtual appliance machine may send an indication to the guest virtual machine to permit the attempted use. As discussed herein, additional authentication or credentialing operations may be used before a user is actually granted access to an active guest virtual machine. If the image status is "inactive" or "disabled" the virtual appliance machine may send an indication to the guest virtual machine that access to the image is to be denied or may send an indication that the use is to be allowed but simultaneously sending an alert regarding the attempted use. As discussed herein, statuses other than "active," "inactive," or "disabled" may be used.

In some implementations, in an operation 211, the guest virtual machine may allow the attempted use or deny the attempted use based on the indication from the virtual appliance machine. As discussed herein, both denial or allowance of the attempted use may be accompanied by generation of an alert regarding the attempted access, deletion of the guest virtual machine, and/or other actions. Process 200 may proceed from operation 211 back to operation 203 wherein an additional indication of attempted use is received. Process 200 may also proceed from operation 211 back to operation 201, wherein a new image status is assigned to the guest virtual machine.

Figure 3:
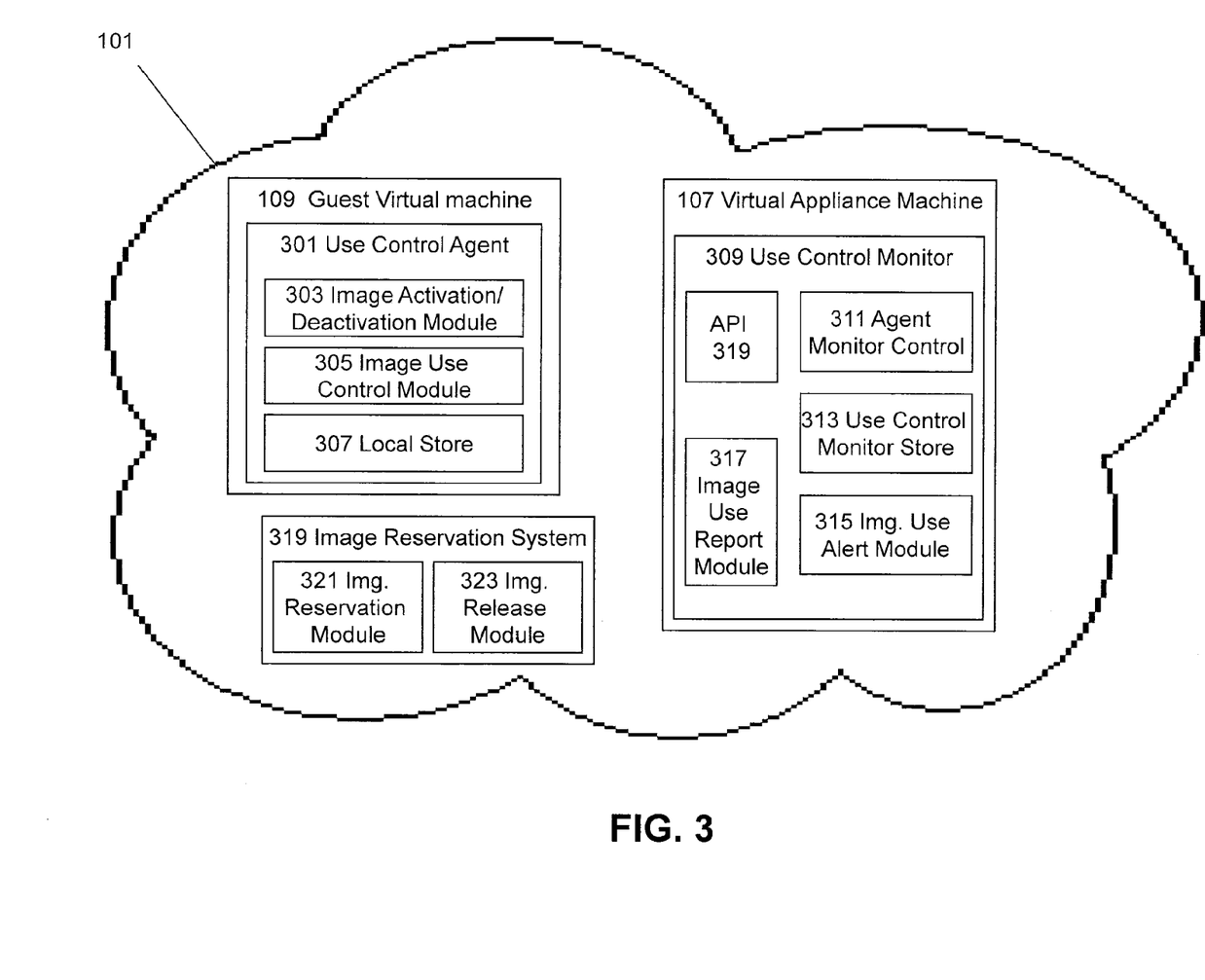
FIG. 3 is an illustration of an example system for providing access control of images in a cloud computing environment, according to various implementations of the invention.

FIG. 3 illustrates an example of detailed the constituent components of cloud environment 101 that may be used in the systems and methods provided herein (including virtual appliance machine 107 and guest virtual machine 109) to provide virtual image segregation and access control.

In some implementations, guest virtual machine 109 may include one or more agents and/or modules that assist in management of access control procedures. For example, in some implementations, guest virtual machine 109 may include a use control agent 301. Use control agent 301 may perform multiple functions relating to access control of its associated guest virtual machine 109. In some implementations, use control agent may include multiple sub-modules that assist in performing these functions.

Figure 4:
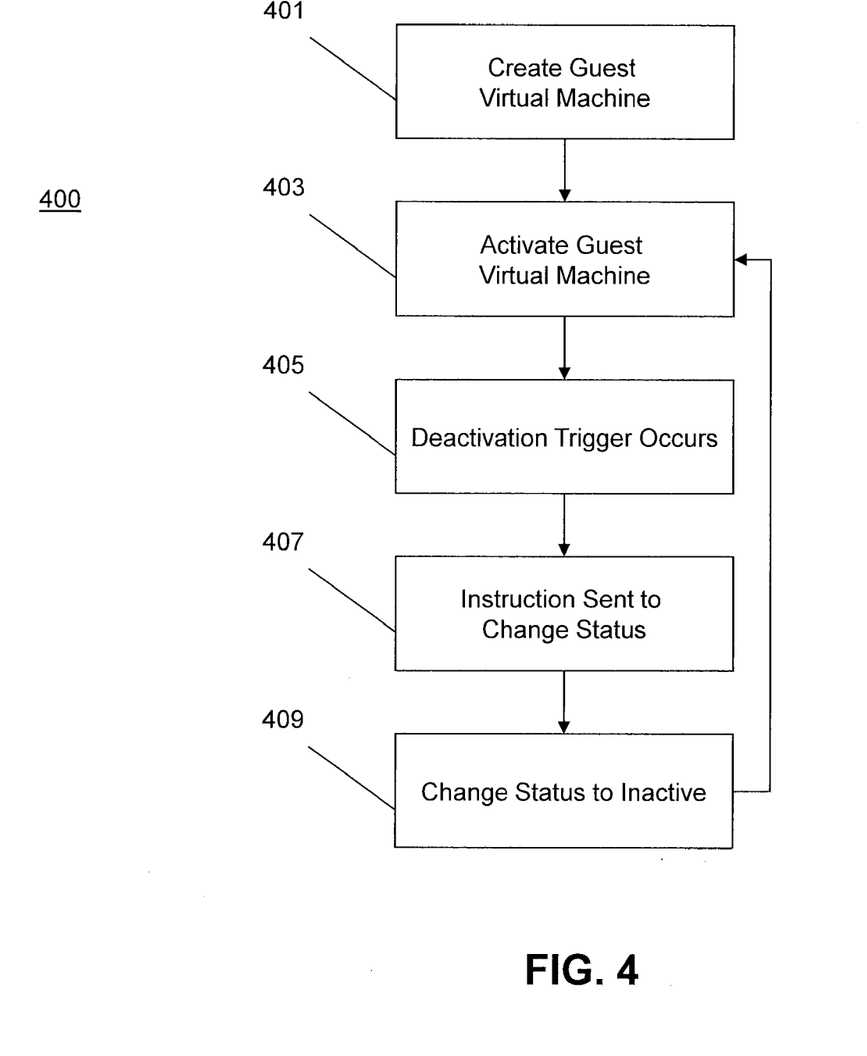
FIG. 4 is an illustration of an example method providing access control of images in a cloud computing environment.

For example, in some implementations, use control agent 301 may include an image activation/deactivation module 303. Image activation/deactivation module 303 may be a local utility of guest virtual machine 109 that provides indications/triggers to virtual appliance machine 107 so as to update the image status of guest virtual machine 109. For example, activation or deactivation triggers may be received by guest virtual machine 109 and subsequently forwarded by image activation/deactivation module 303 to virtual appliance machine 107 to update the image status of guest virtual machine (see e.g., operations 403 and 407 of process 400). In some implementations, any such triggers my be forwarded to virtual appliance machine 107 with a certificate identifying guest virtual machine 109 so that the appropriate image status stored by virtual appliance machine may be located and updated. While in some instances activation/deactivation triggers may be forwarded via guest virtual machine, they may also be provided to virtual appliance machine via other avenues.

Image activation/deactivation module 303 may be the primary avenue by which cloud consumers/customers provide an indication that a guest virtual machine that they have been or will be granted access to is to be activated or deactivated. For example, image activation/deactivation module 303 may receive an indication from a cloud customer's user machine (e.g., user device 103) that a guest virtual machine is to be activated (e.g., because the customer is ready to use it). Image activation/deactivation module 303 may further receive an indication from a cloud customer's user machine (e.g., user device 103) that a guest virtual machine is to be deactivated (e.g., because the customer is done using it).

Furthermore, image activation/deactivation module 303 may send requests to and receive responses from virtual appliance machine 107 to determine a current image status and/or to allow or deny access to guest virtual machine 109 (see e.g., operations 205 and 211 of process 200). As with the communication regarding updating image status, communications by image activation/deactivation module 303 to virtual appliance machine 107 regarding the determination of a current image status may include certificate identifying guest virtual machine 109.

In some implementations, use control agent 301 may also include an image use control module 305. In some implementations, image use control module 305 may communicate with virtual appliance machine 107 to determine the current image status of its associated guest virtual machine 109 and weather access to guest virtual machine 109 can be provided in response to an access request. For example, image use control module 305 may send requests to and receive responses from virtual appliance machine 107 to determine a current image status and/or to allow or deny access to guest virtual machine 109 (see e.g., operations 205 and 211 of process 200). As with the communication regarding updating image status, communications by image use control module 305 to virtual appliance machine 107 regarding the determination of a current image status may include certificate identifying guest virtual machine 109.

In some implementations, image use control module 305 may also check the status (e.g., via sending requests and receiving indications thereof) of the connection between use control agent 301 and various components of virtual appliance machine 107 (e.g., an agent monitor control 311). In some implementations, image use control module 305 further performs shutdowns of and prevents access to guest virtual machine 109 when virtual appliance machine 107 returns an indication that the status of the image is "inactive" (or other status that indicates a shutdown is needed to protect the integrity of guest virtual machine 109). Accordingly, image use control agent 305 may actively monitor (i.e., perform periodic status checks) image statuses stored on virtual appliance machine 107 and prevent the use of inactive/dormant guest virtual machines.

In some implementations, use control agent 301 may also include a local store module 307 that stores the certificate associated with one or more authorized users of guest virtual machine 109. The certificate may be or include a set of information relating to the specific user or users associated with a given guest virtual machine 109, including the parameters of the users' relationship with the provider of cloud environment 101. The certificate may be maintained and/or updated at guest virtual machine 109 by local store module 307. The certificate may be used in communications with virtual appliance machine 107 to identify guest virtual machine. For example, the certificate may accompany communications by image activation/deactivation module 303 when providing status update triggers to virtual appliance machine. Furthermore, the certificate may also be used in communications by image use control module 305 for validation of an image status. The certificate is used by virtual appliance machine 107 to determine the identity of guest virtual machine 109 and therefore search for and return the proper image status of guest virtual machine 109. Accordingly, if a malicious user were to make a copy of guest virtual machine 109, rename it, and attempt to use it, the certificate on the copy would indicate to virtual appliance machine 107 that the copy was derived from guest virtual machine 109. Accordingly, the copy would be disabled and an alert regarding the attempted misuse would be sent to the operator of the cloud environment and/or the proper user of guest virtual machine 109.

In some implementations, virtual appliance machine 107 may include one or more agents or modules that enable the image access control provided herein. For example, virtual appliance machine 107 may include a use control monitor 309 which may be installed on and/or executed by a virtualization host (such as, for example, VMware ESXi, Microsoft Hyper-v or other vendor). A virtualization host is the physical machine that hosts a set of virtual machines (it may also be called, in many cases, a "hypervisor." Virtual appliances in a virtual computing environment run on the virtualization host (or on multiple virtualization hosts). In some implementations, use control monitor 309 may include one or more sub-modules that provide access control functions. For example, in some implementations, use control module 309 may include an agent monitor control 311 receives requests from image use control module 305 of guest virtual machine 109 (or other guest virtual machine) for the image status of guest virtual machine 109 (see e.g., operation 205 of process 200) and provides the image status and/or access determinations to image use control module 305 for enforcement of image access control (see e.g., operation 209 of process 200) as discussed herein.

In some implementations, agent monitor control 311 may also set/change image statuses. For example image statuses for guest virtual machines stored on virtual appliance machine 107 may be altered per requests from use control agents 301 (e.g., image activation/deactivation module 303) that stem from activation/deactivation triggers received at guest virtual machines. Image statuses may also be changed by agent monitor control 311 as a result activation/deactivation triggers received from other avenues.

In some implementations, agent monitor control 311 may also manage the creation of certificates identifying guest virtual machines, the verification/identification of particular guest virtual machines and associated user parameters using certificates, and may manage alert or report policies regarding specific guest virtual machines.

In some implementations, use control monitor 309 may include an image use control monitor store 313 that may store, image status information and user certificates for guest virtual machines for whom virtual appliance machine 107 provides access control. Use control monitor store 313 may also store the one or more policies discussed herein that dictate what to do in case of an access attempt on a deactivated image (e.g., warn of unauthorized use, disable an image, whether to send an alert, where to send alerts, how to send alerts, notification of attempting user, etc.).

In some implementations, use control monitor 309 may also include an image use alert module 315, which may monitor use attempts and generate alerts. If a use attempt is made on a deactivated guest virtual machine, image use alert module 315 may access the guest virtual machine's associated policy on control monitor store 313 and send alerts accordingly. For example, a policy may indicate whether or not an alert is to be generated when a use attempt on guest virtual machine having an image status of "inactive" (or similar status) is detected. Policies may be stored for each guest virtual machine whose access is controlled by virtual appliance machine 107. In addition to including an indication of whether or not to send an alert if a deactivated image is attempted to be accessed, policies may include am indication of who an alert should be sent to (e.g., users, cloud environment operators or specific individuals related thereto), how to send the alert (e.g., email, SMS text, etc.), whether the guest virtual machine should be deleted after an unauthorized access attempt, whether the user attempting to access the inactive image should be notified of the image status, and/or other parameters. Any generated alarms and any details associated therewith may be stored in control monitor store 313.

In some implementations, use control monitor 309 may also include an image use report module 317 which may monitor image statuses and alarms from use control monitor store 313 and generates reports thereon. In some instances, reports on alerts generated may include timing of an alert, who tried to use a deactivated guest virtual machine, where alerts were sent, how they were sent, and/or other information. Reports on image status may also be generated. For example, queries on image statuses can be run and the resultant reports may be used to find dormant images that were not yet disposed of and therefore need to be deleted.

In some implementations, cloud environment 101 may include an image reservation system 319 that is used by users (i.e., cloud consumers) for reserving protected or unprotected guest virtual machines. Image reservation system 319 may include an image reservation module 321 which users interact with to reserve a guest virtual machine. In some instances, if a user wants to reserve a guest virtual machine that is protected using the systems and methods described herein, a new guest virtual machine will be setup with a use control agent 301 and corresponding modules as described herein that is controlled by a virtual appliance machine 107 having a user control monitor 309 and corresponding modules. If automatic activation has been requested in the process, the image will automatically be activated and have an image status of "active" using an image activate/deactivate module 303.

In some implementations, the image reservation system 319 may include an image release module 323, which is used by users to release a guest virtual machine (i.e., indicate that use is longer needed). If the access protection systems and/or methods described herein are used and an image status has not been marked to be "inactive" or "disabled" prior to the release, the image will be automatically deactivated so it can no longer be used after the release.

In an instance wherein someone attempts to use a guest virtual machine (e.g., guest virtual machine 109) when it has no connectivity to its controlling virtual appliance machine (e.g., virtual appliance machine 107) the guest virtual machine will not start, as it has to be able to connect to the virtual appliance machine to obtain its updated status. Accordingly, an additional control is provided for the instance wherein a user attempts to go circumvent security measures by starting the guest virtual machine in a different place that may not be controlled by the security measures described herein. The use control agent 301 of the guest virtual machine will be moved along with the guest virtual machine and will block the startup (like it does in the case of trying to start a disposed virtual machine) as no connectivity to the virtual appliance machine exists (the use control agent may also send any applicable alerts, etc.).

As discussed herein, the systems and methods provided herein provide for activation and deactivation of virtual images/guest virtual machines. FIG. 4 illustrates a process 400, which is an example of a process for providing secure virtual image access. Process 400 may include an operation 401 wherein a guest virtual machine (e.g., guest virtual machine 109) is created. As discussed herein, creation of guest virtual machine may involve instantiating a template in cloud environment 101 and adding any specific software, interfaces, and/or other customizations thereto. In an operation 403, guest virtual machine 109 may be activated (e.g., by image activation/deactivation module 303). In some implementations, guest virtual machine 109 may have its image status marked as "active" automatically when guest virtual machine 109 is created and being setup (i.e., loaded with software, etc.). In some instances, users/customers may request this automatic activation when gust virtual machine 109 is ordered from the cloud provider. In some implementations, guest virtual machine 109 may be created and not automatically activated (it may have an initial image status of null), but may require an indication (e.g., from a user, the they are ready for use; from cloud provider, that the user is permitted access) to activate guest virtual machine 109. Upon activation, the image status for guest virtual machine 109 may be marked as "active" by image activation/deactivation module 303. A certificate for guest virtual machine 109 may be created by agent monitor control 311 of virtual appliance machine 107 and sent to image use control module 305 of guest virtual machine upon activation. This certificate may then be sent back to agent monitor control 311 on virtual appliance machine 107 when use attempts are made.

In an operation 405, a deactivation trigger may occur, which indicates that guest virtual machine is to be deactivated (e.g., using image activation/deactivation module 303). For example, a user may send an indication that guest virtual machine 109 is to be deactivated. Other actions may also serve as a deactivation triggers such as, for example, the expiry or breach of a contract; an upgrade to an more recent application version; image remains dormant for predetermined amount of time; or other occurrence. Accordingly, in an operation 407, image use control module 305 may send a deactivation signal to agent monitor control 311. In an operation 409 agent monitor control 311 may change the image status of guest virtual machine 109 to "inactive" or "disabled." From this point on guest virtual machine 109 can no longer be used, and attempts to use it will be unsuccessful and may generate alerts as discussed herein.

In some instances, a user may attempt to start or use a guest virtual machine after it has been deactivated (e.g., in operation 201). As discussed above with respect to process 200, the attempted use may be detected (e.g., in operation 203) at guest virtual machine 109 by image use control module 305. Image use control module 305 may then connect to agent monitor control 311 of virtual appliance machine 107 (e.g., in operation 205) and forwards an indication of the use attempt (along with a local certificate for the guest virtual machine) to virtual appliance machine 107. Agent monitor control 311 then uses the certificate to identify the guest virtual machine 109 to look up the images status of guest virtual machine 109 at user control monitor store 313 (e.g., in operation 207). If the image status of guest virtual machine 109 is "inactive," virtual appliance machine 107 determines that the access attempt should be denied (e.g., in operation 209) and/or that an alert of the use should be sent. In some instances, if an image status cannot be found (i.e., the guest virtual machine was deleted), the attempt can likewise be denied and/or an alert be sent.

In some implementations, an alert instance may be generated by agent control monitor 311 inside image use control monitor store 313 when the access attempt is denied. Image use alert module 315 may be used to send an the alert according to a profile associated with guest virtual machine 109. Furthermore, agent monitor control 311 may send an indication that the status is "inactive" to image use control module 305 of guest virtual machine 109 (e.g., in operation 211) such that image use control module 305 may prevent the attempted mounting or use (e.g., in operation 213). Agent monitor control 311 may then take steps to close guest virtual machine 109, which may include deleting it from cloud environment 101 (optionally can be setup just to warn and not to close).

As described herein, in some implementations, the systems and methods for image access control provided herein may include report generation features. For example, image use report module 317 may use image status information, generated and issued alert information, and/or other information from use control monitor store 313 to generate one or more reports. For example, the one or more reports may include information relating to image use timing and statistics, alerts (including logs regarding who improperly tries to improperly access an image and the timing regarding such attempts), and/or other information.

As described herein, in some implementations, a guest virtual machine (e.g., guest virtual machine 109) may be set up and installed in a cloud environment (e.g., cloud environment 101) for use by user devices (e.g., user devices 103). When guest virtual machine 109 is ready for use, its image status may be marked as "active" (e.g., in operation 201) on both the use control monitor store 313 of virtual appliance machine and local store 307 of guest virtual machine. After the guest virtual machine is activated, then, use control agent 301 begins monitoring attempted uses of the image. Attempts to use the guest virtual machine may be received by use control agent 301 (e.g., in operation 203), the image status of the guest virtual machine may be checked (e.g., in operations 205, 207) and use may be permitted (e.g., in operations 209, 211). When authorized use of the image is terminated (e.g., a user marks the image for deactivation, a contract for use of the image expires or is otherwise terminated, and/or other deactivation trigger)

the certificate associated with the guest virtual machine is provided to the controlling virtual appliance machine (to properly identify the particular guest virtual machine) along with an indication that the image status should be changed to "inactive" or "disabled" (e.g., in operation 201) both on local store 307 and use control monitor store 313.

In some instances, a number of users may be provided with access to a single guest virtual machine. Accordingly, these guest virtual machines may be activated by or for these who may use it and subsequently deactivate it. Accordingly, in some instances, guest virtual machines may be left dormant if a deactivation trigger is not timely provided. This could lead to security exposure as such guest virtual images should no longer be available for use. Accordingly, a cloud environment provider may run a search for dormant images (e.g., those that have not been in use for a predetermined period of time). After these dormant images are discovered, they may be verified as no longer needed and assigned an inactive image status. Reports can also be sent to appropriate personnel to identify dormant images.

In some instances, guest virtual machines may be used in parallel. For example, a user may obtain and activate a guest virtual machine such that it is available for use. In some instances, a "clone" may be taken from the image for backup purposes or other regular use. Accordingly, the clone may be assigned an image status of "disabled." In this manner, if an attempt to use the clone is made under certain circumstances (e.g., when another user is conducting authorized use of the primary guest virtual machine; when no disruption necessitating use of the clone has occurred; after a contract for use of the primary image has expired, etc.) the use may be denied (e.g., because the clone exists in an "disabled" state until it is needed to backup the primary image) and an alert may be generated. If the clone is needed (e.g., the primary guest virtual machine is corrupted/damaged), the image status of the clone may be changed to "active," enabling its use.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the invention described herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

Other implementations, uses, and advantages of the disclosed technology will be apparent to those skilled in the art from consideration of the specification and practice of the invention disclosed herein. The specification should be considered exemplary only, and the scope of the technology disclosed herein is accordingly intended to be limited only by any associated claims.

What is claimed is:

1. A method to provide secure access in a virtual computing environment, the method executed by a processor comprising hardware, the processor configured to perform a plurality of operations, the operations comprising:
   assigning, by a virtual access control machine of a virtual computing environment, a status to a guest virtual machine supporting a service, wherein the guest virtual machine is accessible to a user through a network;
   receiving, at the virtual access control machine, information from the guest virtual machine representative of an attempted use of the guest virtual machine;
   receiving, at the virtual access control machine, a request, by the guest virtual machine, for the status of the guest virtual machine;
   determining, at the virtual access control machine, an action to take based on the status; and
   sending, from the virtual access control machine, information to the guest virtual machine regarding the (i) status of the guest virtual machine in response to the request, or (ii) the action, or (iii) both (i) and (ii).

2. The method of claim 1, wherein assigning a status includes assigning, after the guest virtual machine is created and ready for use, a status indicating that the guest virtual machine is able to be accessed by an authorized user, and wherein the action includes allowing the attempted use of the guest virtual machine to an authorized user.

3. The method of claim 1, wherein assigning a status includes assigning a status indicating that the guest virtual machine is not to be used by anyone, and wherein the action includes preventing the attempted use of the guest virtual machine.

4. The method of claim 3, further comprising recording an indication of the prevented attempted use of the guest virtual machine.

5. The method of claim 3, wherein the action further comprises sending an alert regarding the unauthorized attempt to start the guest virtual machine.

6. The method of claim 1, wherein assigning a status includes assigning a status indicating that an alert is to be sent upon receipt of any attempted use of the guest virtual machine, and wherein the action includes sending the alert.

7. The method of claim 1, wherein assigning a status includes changing a status of the guest virtual machine from a status indicating that the guest virtual machine is able to be accessed by an authorized user to a status indicating that the guest virtual machine is not to be used by anyone, and wherein the action includes preventing the attempted use of the guest virtual machine.

8. The method of claim 1, further comprising providing a report regarding a plurality of guest virtual machines in the virtual machine environment, wherein the report includes information regarding one or more selected from: attempted use of any of the plurality of guest virtual machines, denied use attempts of any of the plurality of guest virtual machines, or any of the plurality of guest virtual machines that have not been used in a predetermined amount of time.

9. A system to provide secure access in a virtual computing environment, the system comprising:
a processor comprising hardware, the processor configured to:
assign, by a virtual access control machine of a virtual computing environment, a status to a guest virtual machine supporting a service, wherein the guest virtual machine is accessible to a user through a network,
receive, at the virtual access control machine, information from the guest virtual machine representative of an attempted use of the guest virtual machine,
receive, at the virtual access control machine, a request, by the guest virtual machine, for the status of the guest virtual machine,
determine, at the virtual access control machine, an action to take based on the status, and
send, from the virtual access control machine, information to the guest virtual machine regarding the (i) status of the guest virtual machine in response to the request, or (ii) the action, or (iii) both (i) and (ii).

10. The system of claim 9, wherein the processor configured to assign a status is further configured to assign, after the guest virtual machine is created and ready for use, a status indicating that the guest virtual machine is able to be accessed by an authorized user, and wherein the action includes allowance of the attempted use of the guest virtual machine to an authorized user.

11. The system of claim 9, wherein the processor configured to assign a status is further configured to assign a status indicating that the guest virtual machine is not to be used by anyone and wherein the action includes prevention of the attempted use of the guest virtual machine.

12. The system of claim 11, wherein the processor is further configured to record an indication of the prevented attempted use of the guest virtual machine.

13. The system of claim 11, wherein the action further comprises sending of an alert regarding the unauthorized attempt to start the guest virtual machine.

14. The system of claim 9, wherein the processor configured to assign a status is further configured to assign a status indicating that an alert is to be sent upon receipt of any attempted use of the guest virtual machine, and wherein the action includes sending the alert.

15. The system of claim 9, wherein the processor configured to assign a status is further configured to change a status of the guest virtual machine from a status indicating that the guest virtual machine is able to be accessed by an authorized user to a status indicating that the guest virtual machine is not to be used by anyone, and wherein the action includes prevention of the attempted use of the guest virtual machine.

16. The system of claim 9, wherein the processor is further configured to provide a report regarding a plurality of guest virtual machines in the virtual machine environment, wherein the report includes information regarding one or more selected from: attempted use of any of the plurality of guest virtual machines, denied use attempts of any of the plurality of guest virtual machines, or any of the plurality of guest virtual machines that have not been used in a predetermined amount of time.

17. A non-transitory computer-readable medium including computer-executable instructions thereon, the computer-executable instructions, when executed, causing a processor to:
assign, by a virtual access control machine of a virtual computing environment, a status to a guest virtual machine supporting a service, wherein the guest virtual machine is accessible to a user through a network;
receive, at the virtual access control machine, information from the guest virtual machine representative of an attempted use of the guest virtual machine;
receive, at the virtual access control machine, a request, by the guest virtual machine, for the status of the guest virtual machine;
determine, at the virtual access control machine, an action to take based on the status; and
send, from the virtual access control machine, information to the guest virtual machine regarding the (i) status of the guest virtual machine in response to the request, or (ii) the action, or (iii) both (i) and (ii).

18. The computer-readable medium of claim 17, wherein the instructions to assign a status include instructions to assign a status indicating that the guest virtual machine is not to be used by anyone, and wherein the action includes preventing the attempted use of the guest virtual machine.

19. The computer-readable medium of claim 17, wherein the instructions to assign a status include instructions to assign a status indicating that an alert is to be sent upon receipt of any attempted use of the guest virtual machine, and wherein the action includes sending the alert.

20. The computer-readable medium of claim 17, wherein the instructions to assign a status include instructions to change a status of the guest virtual machine from a status indicating that the guest virtual machine is able to be accessed by an authorized user to a status indicating that the guest virtual machine is not to be used by anyone, and wherein the action includes preventing the attempted use of the guest virtual machine.

\* \* \* \* \*